United States Patent
Xie et al.

(10) Patent No.: US 11,886,225 B2
(45) Date of Patent: Jan. 30, 2024

(54) MESSAGE PROCESSING METHOD AND APPARATUS IN DISTRIBUTED SYSTEM

(71) Applicant: Huawei Cloud Computing Technologies Co., Ltd., Guizhou (CN)

(72) Inventors: Xiaoqin Xie, Beijing (CN); Kun Li, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 17/568,828

(22) Filed: Jan. 5, 2022

(65) Prior Publication Data
US 2022/0129333 A1    Apr. 28, 2022

Related U.S. Application Data

(63) Continuation of application No. PCT/CN2019/109656, filed on Sep. 30, 2019.

(51) Int. Cl.
*G06F 9/54* (2006.01)
*G06F 11/34* (2006.01)

(52) U.S. Cl.
CPC .......... *G06F 9/546* (2013.01); *G06F 11/3476* (2013.01)

(58) Field of Classification Search
None
See application file for complete search history.

(56) References Cited

U.S. PATENT DOCUMENTS

| | | |
|---|---|---|
| 8,903,871 B2 | 12/2014 | Hwang |
| 2005/0114706 A1 | 5/2005 | Destefano et al. |
| 2010/0011031 A1 | 1/2010 | Huang et al. |
| 2013/0031086 A1* | 1/2013 | Strelec ............... G06F 16/2465 707/E17.014 |
| 2013/0212420 A1* | 8/2013 | Lawson ............... G06F 9/5072 713/400 |
| 2014/0089265 A1* | 3/2014 | Talagala ................ G06F 16/22 707/674 |

(Continued)

FOREIGN PATENT DOCUMENTS

| CN | 107851275 A | 3/2018 |
|---|---|---|
| CN | 110263009 A | 9/2019 |

OTHER PUBLICATIONS

"Consumption-Realize highly reliable consumption through Consumer Library," Alibaba Cloud, Update time: Jun. 9, 2021 11:32, with an English machine translation, 28 pages.

*Primary Examiner* — Charles E Anya

(74) *Attorney, Agent, or Firm* — Conley Rose, P.C.

(57) ABSTRACT

In a message processing method, a message stream platform receives a plurality of log messages from a production platform, and the plurality of log messages are used to record information about a first service executed by the production platform. The message stream platform stores the plurality of log messages in a log file based on time segments. Then, the message stream platform may send messages in a same time segment in the plurality of log files to a consumption platform based on the time segment mark. According to the message processing method, the messages in the same time segment in the plurality of log files may be sent to the consumption platform to ensure that the consumption platform obtains the log messages generated in the same time segment.

20 Claims, 11 Drawing Sheets

(56) References Cited

U.S. PATENT DOCUMENTS

2015/0281453 A1* 10/2015 Maturana .............. G06F 9/5072
379/265.12
2017/0053008 A1   2/2017 Frenkel et al.
2017/0139806 A1*  5/2017 Xu ...................... G06F 11/0766
2018/0114126 A1   4/2018 Das et al.

* cited by examiner

MESSAGE PROCESSING METHOD AND APPARATUS IN DISTRIBUTED SYSTEM

CROSS-REFERENCE TO RELATED APPLICATIONS

This is a continuation of Int'l Patent App. No. PCT/CN2019/109656, filed on Sep. 30, 2019, which is incorporated by reference.

FIELD

This disclosure relates to the field of distributed systems, and in particular, to a message processing method and an apparatus in a distributed system.

BACKGROUND

A publish-subscribe function in a distributed system enables that a production device on a production platform distributes, to a message stream platform, log messages that are generated in a process of executing a service of a topic by the production device and that are used to record the executed service. A consumer device on a consumption platform subscribes to, on the message stream platform, the log messages corresponding to the topic of the service executed by the production platform. The message stream platform sends the log messages corresponding to the topic to the consumer device based on the subscribed topic. The consumer device processes content recorded in the log messages, to implement a preset function. The publish-subscribe function enables a looser coupling relationship between the production device and the consumer device. The production device does not care about an address of the consumer device, and the consumer device also does not care about an address of the production device.

The production platform includes a plurality of production devices, and the plurality of production devices may process the service in parallel. During service processing, each production device simultaneously generates log messages describing an execution process of the service. For example, in a scenario in which the production platform is a cloud storage platform that provides a cloud storage service for a user and the cloud storage platform is an object storage system, an enterprise user that provides an album service for a terminal user may request to allocate one or more buckets on the cloud storage platform. After the terminal user applies for the album service, the enterprise user may allocate, in the bucket, storage space to the terminal user for the user to store a photo. In this scenario, the topic of the service may be defined as the album. In a process in which the user stores the photo, each time the terminal user stores one photo in the bucket, the production platform generates one log message recording related information of the photo, for example, a topic identifier of the service, a photo generation time, a photo size, and an identifier of the bucket in which the photo is located. The log messages generated on the production platform are sent to the message stream platform.

The message stream platform includes one management device and a plurality of brokers. After receiving the log messages published by the production platform, the management device distributes the received log messages to the plurality of brokers. Each broker records the received messages in a log file corresponding to the topic identifier in the log message.

The consumer platform includes a plurality of consumer devices, which are used to obtain the log messages recorded by the message stream platform and further process the obtained log messages. For log messages of a same topic, the consumption platform selects several consumer devices to form a consumer group to send, to the message stream platform, a topic identifier of log messages that need to be consumed by the consumer group, to subscribe to the log messages of the topic. The broker on the message stream platform may send, in parallel, to all consumer devices in the consumer group, the log messages recorded in a log file, corresponding to the topic, to consume the log messages of the same topic in parallel.

In the distributed system, although the messages of the same topic can be processed in parallel, due to performance differences of the brokers or the consumer devices, when messages of a topic are consumed in parallel, some log files are consumed comparatively quickly, and some log files are consumed comparatively slowly. As a result, the messages in the log files cannot be consumed synchronously.

SUMMARY

Embodiments provide a message stream processing method. A time segment mark is added to each of log messages on a message stream platform, and log messages generated in a same time segment are sent to a consumption platform, so that the consumption platform consumes the log messages based on the time segment.

A first aspect provides a message processing method applied to a message stream platform. The method includes: receiving a plurality of log messages from a production platform, where the plurality of log messages are used to record information about a first service executed by the production platform; storing the plurality of log messages in a log file based on a time segment; and sending log messages that are related to the first service and that are in a first time segment to a consumption platform.

According to the method provided in the embodiment, the time segment mark is added to each of the log messages on the message stream platform, and log messages generated in a same time segment are sent to the consumption platform, so that the consumption platform consumes the log messages based on the time segment, and the log messages are synchronized based on the time segment.

Optionally, in a possible implementation of the first aspect, the sending log messages that are related to the first service and that are in a first time segment to a consumption platform includes: sending the log messages that are related to the first service and that are in the first time segment to the consumption platform according to a request from the consumption platform.

The log messages are sent to the consumption platform according to the request from the consumption platform, to implement on-demand consumption on the consumption platform.

Optionally, in a possible implementation of the first aspect, the sending log messages that are related to the first service and that are in a first time segment to a consumption platform includes: sending the log messages that are related to the first service and that are in the first time segment to the consumption platform based on a subscription relationship; and after the log messages that are related to the first service and that are in the first time segment are sent to the consumption platform, sending log messages that are related to the first service and that are in a second time segment to the consumption platform.

The log messages are sent according to a time segment sequence, so that the consumption platform can consume the log messages according to the time segment sequence.

Optionally, in a possible implementation of the first aspect, the storing the plurality of log messages in a log file based on a time segment includes: allocating a time segment mark to each of the plurality of log messages, where the time segment mark is used to identify a segment of time; and storing the plurality of log messages in the log file based on the time segment mark.

The time segment mark is set for the time segment, and consumption of log messages in each time segment may be controlled based on the time segment mark, to facilitate management.

Optionally, in a possible implementation of the first aspect, the allocating a time segment mark to each of the plurality of log messages includes: periodically updating the time segment mark, and marking a time segment for each of subsequently received log messages by using the updated time segment mark.

Optionally, in a possible implementation of the first aspect, the method further includes: receiving an association request sent by the production platform, where the association request carries shard identifiers of both a second shard and a first shard or shard identifiers of both a second shard and a third shard, the second shard is obtained by splitting the first shard or by aggregating the first shard and the third shard, the first shard and the third shard each are a subset formed by the log messages about executing the first service, and the association request is sent by the production platform during the splitting or aggregation; and setting, according to the association request, a new time segment mark for each of subsequently received log messages belonging to the first shard and the second shard.

After a shard dynamically changes, the new time segment mark is added to each of the log messages, so that order-preserving consumption can still be implemented when a same object belongs to a different shard because of the dynamical change of the shard.

Optionally, in a possible implementation of the first aspect, the method further includes: receiving an association request sent by the production platform, where the association request carries a shard identifier of a second shard, the second shard is obtained by splitting a first shard or by aggregating a first shard and a third shard, the first shard and the third shard each are a subset formed by the log messages about executing the first service, and the association request is sent by the production platform during the splitting or aggregation; and setting, according to the association request, a new time segment mark for each of subsequently received log messages related to the first service.

After a shard dynamically changes, the new time segment mark is added to each of the log messages, so that order-preserving consumption can be implemented when a same object belongs to a different shard because of the dynamical change of the shard.

A second aspect provides a message stream platform. The message stream platform includes a management module and a broker module. The management module is configured to receive a plurality of log messages from a production platform, where the plurality of log messages are used to record information about a first service executed by the production platform; and forward the plurality of log messages to the broker module. The broker module is configured to store the plurality of log messages in a log file based on a time segment, and send log messages that are related to the first service and that are in a first time segment to a consumption platform.

Optionally, in a possible implementation of the second aspect, the broker module is configured to: send the log messages that are related to the first service and that are in the first time segment to the consumption platform according to a request from the consumption platform.

Optionally, in a possible implementation of the second aspect, the broker module is configured to: send the log messages that are related to the first service and that are in the first time segment to the consumption platform based on a subscription relationship; and after the log messages that are related to the first service and that are in the first time segment are sent to the consumption platform, send log messages that are related to the first service and that are in a second time segment to the consumption platform.

Optionally, in a possible implementation of the second aspect, the management module is further configured to set a time segment mark, where the time segment mark is used to identify a segment of time, and send the time segment mark to the broker module; and the broker module stores the plurality of log messages in the log file based on the time segment mark.

Optionally, in a possible implementation of the second aspect, the management module is further configured to update the time segment mark periodically, and send the updated time segment mark to the broker module; and the broker module is further configured to mark a time segment for each of received log messages by using the updated time segment mark.

Optionally, in a possible implementation of the second aspect, the management module is further configured to, when an association request sent by the production platform is received, update the time segment mark, and send the updated time segment mark to the broker module, where the association request carries shard identifiers of both a second shard and a first shard or shard identifiers of both a second shard and a third shard, the second shard is obtained by splitting the first shard or by aggregating the first shard and the third shard, the first shard and the third shard each are a subset formed by the log messages about executing the first service, and the association request is sent by the production platform during the splitting or aggregation; and the broker module is configured to mark a time segment for each of subsequently received log messages by using the updated time segment mark.

Optionally, in a possible implementation of the second aspect, the management module is further configured to, when an association request sent by the production platform is received, update the time segment mark, and send the updated time segment mark to the broker module, where the association request carries a shard identifier of a second shard, the second shard is obtained by splitting a first shard or by aggregating a first shard and a third shard, the first shard and the third shard each are a subset formed by the log messages about executing the first service, and the association request is sent by the production platform during the splitting or aggregation; and the broker module is configured to set, according to the association request, a new time segment mark for each of subsequently received log messages related to the first service.

Effects achieved by various possible implementations of the message stream platform provided in the second aspect are basically the same as those achieved by various possible implementations of the method provided in the first aspect. Details are not described herein again.

A third aspect provides a message processing method applied to a message stream platform, including: receiving log messages sent by a production platform, and storing the log messages based on a topic of a service executed by the production platform, where the log messages are used to record information about the service executed by the production platform, and the topic is used to identify the service executed by the production platform; receiving a consumption request sent by a consumption platform, where the consumption request carries a topic corresponding to log messages that the consumption platform requests to obtain; and sending log messages that are related to the topic and that are in a time segment to the consumption platform.

The storing the log messages based on a topic of a service executed by the production platform includes: allocating a time segment mark to each of the plurality of log messages, where the time segment mark is used to identify a segment of time; and storing, based on the time segment mark, the plurality of log messages in the log file corresponding to the topic.

Various possible implementations of the message processing method provided in the third aspect are basically the same as the various possible implementations provided in the first aspect, and have basically the same beneficial effects. Details are not described herein again.

A fourth aspect provides a message stream platform, including: a management module configured to: receive log messages sent by a production platform, where the log messages are used to record information about a service executed by the production platform, and the topic is used to identify the service executed by the production platform; and forward the plurality of log messages to a broker module; and the broker module configured to: store the log messages based on a topic of the service executed by the production platform, receive a consumption request sent by a consumption platform, and send log messages that are related to the topic and that are in a time segment to the consumption platform according to the consumption request.

Various possible implementations of the message processing method provided in the fourth aspect are basically the same as the various possible implementations provided in the second aspect, and have basically the same beneficial effects. Details are not described herein again.

A fifth aspect provides a distributed system. The system includes: a production platform configured to send a plurality of log messages, where the plurality of log messages are used to record information about a first service executed by the production platform; a message stream platform configured to store the plurality of log messages in a log file based on a time segment; and a consumption platform configured to send a consumption request to the message stream platform; where the message stream platform is further configured to send log messages that are related to the first service and that are in a first time segment to the consumption platform according to the consumption request.

Various possible implementations of the distributed system provided in the fifth aspect are basically the same as the various possible implementations provided in the second aspect, and have basically the same beneficial effects. Details are not described herein again.

A sixth aspect provides a distributed system. The system includes: a production platform configured to send a plurality of log messages, where the plurality of log messages are used to record information about a first service executed by the production platform; and a message stream platform configured to store the plurality of log messages in a log file based on a time segment, and send log messages that are related to the first service and that are in a first time segment to a consumption platform.

Various possible implementations of the distributed system provided in the sixth aspect are basically the same as the various possible implementations provided in the second aspect, and have basically the same beneficial effects. Details are not described herein again.

A seventh aspect provides a distributed system. The system includes: a production platform configured to send a plurality of log messages; a message stream platform configured to: receive the plurality of logs sent by the production platform, and store the plurality of log messages in a log file based on a time segment, where the plurality of log messages are used to record information about a first service executed by the production platform; and a consumption platform configured to send a consumption request to the message stream platform; where the message stream platform is further configured to send log messages that are related to the first service and that are in a first time segment to the consumption platform according to the consumption request.

Various possible implementations of the distributed system provided in the seventh aspect are basically the same as the various possible implementations provided in the second aspect, and have basically the same beneficial effects. Details are not described herein again.

An eighth aspect provides a message stream platform. The message stream platform includes: a management device, where the management device includes a processor and a memory, the memory in the management device stores a program instruction, and the processor in the management device executes the program instruction to perform related steps in the method provided in the first aspect; and a broker, where the broker includes a processor and a memory, the memory in the broker stores a program instruction, and the processor in the processing device executes the program instruction to perform related steps in the method provided in the first aspect.

A ninth aspect of the embodiments provides a non-transient computer storage medium. The computer-readable storage medium stores a computer program. The computer program is executed by a processor to implement the method described in the first aspect or any possible implementation of the first aspect.

DETAILED DESCRIPTION

Figure 1:
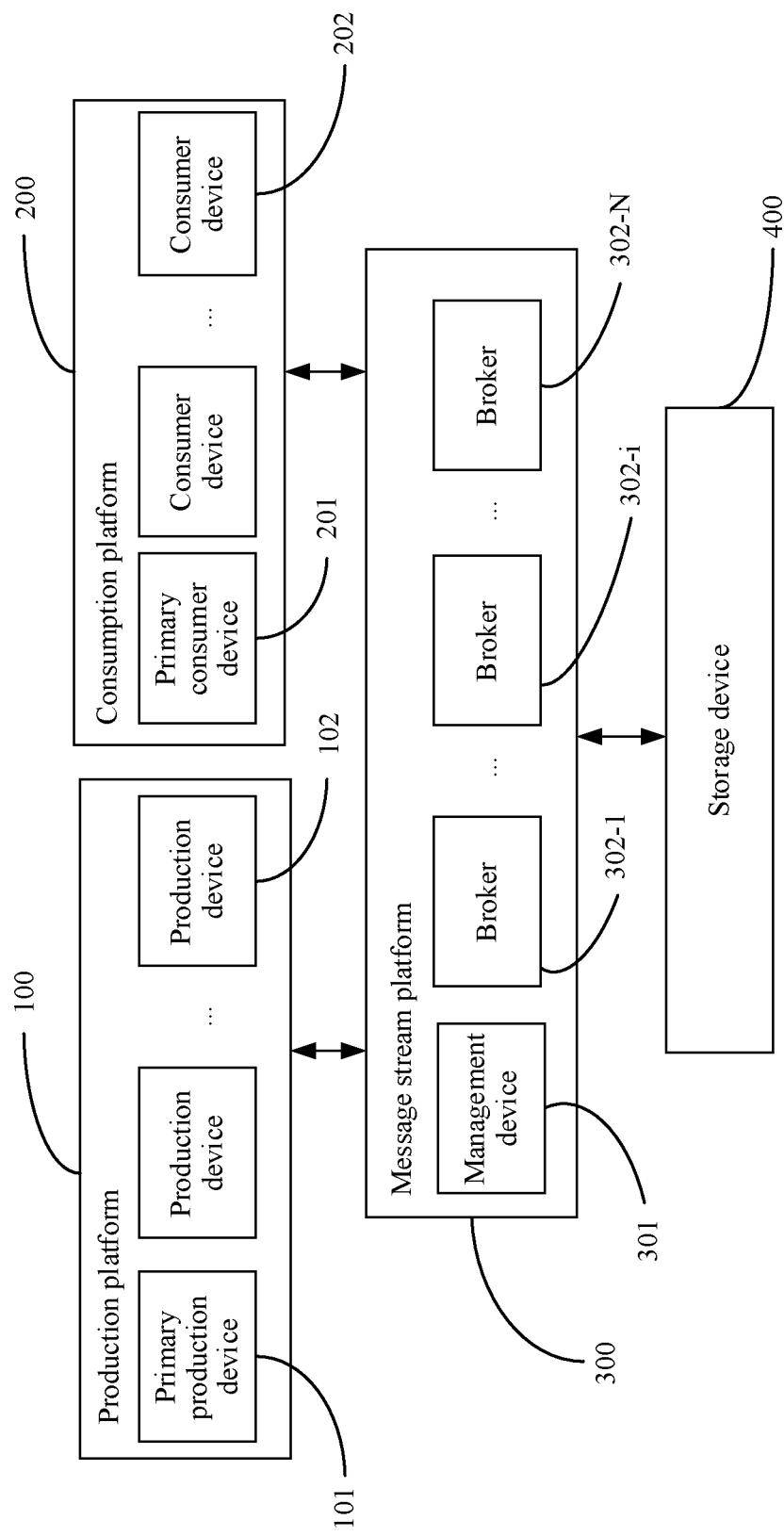
FIG. 1 is an architectural diagram of a distributed system according to an embodiment.

FIG. 1 is an architectural diagram of a distributed system according to an embodiment. The distributed system includes a production platform 100, a message stream platform 200, and a consumption platform 300. The production platform 100 includes a primary production device 101 and a plurality of production devices 102. In addition to performing functions of the production device 102, the primary production device 101 is further responsible for managing all production devices. When executing a service, the primary production device 101 and the production device 102 simultaneously generate log messages that describe a process of executing the service. In this embodiment, the production platform is still used as a cloud storage platform. The cloud storage platform is used as an object storage system. An enterprise user requests to allocate a bucket on the cloud storage platform to provide an album service for a terminal user.

In this embodiment, the primary production device 101 and the production device 102 on the production platform may be independent servers, or may be virtual devices. When the primary production device 101 and the production device 102 are the virtual devices, the plurality of virtual devices may be constructed on a plurality of servers, or may be constructed on a same server. A layout of the virtual machine may be determined based on an actual running environment.

The message stream platform 300 includes a management device 301 and a plurality of brokers 302-1 to 302-N. The management device 301 is configured to receive the log messages sent by the production devices 102 on the production platform 100, and send the received log messages to the brokers 302-1 to 302-N for processing. Each of the brokers 302-1 to 302-N stores the received log messages into a log file corresponding to a topic identifier in the log messages in a storage device 400. The consumption platform 200 includes a primary consumer device 201 and a plurality of consumer devices 202. In addition to performing a function of the consumer device 202, the primary consumer device is further responsible for managing the consumer device 202.

In this embodiment, the management device 301 and the brokers 302-1 to 302-N on the message stream platform 300 may be independent servers, or may be virtual devices. When the management device 301 and the brokers 302-1 to 302-N are the virtual devices, the plurality of virtual devices may be constructed on a plurality of servers, or may be constructed on a same server. A layout of the virtual machine may be determined based on an actual running environment. When the brokers 302-1 to 302-N are the independent servers, the storage device 400 is a built-in memory in the brokers 302-1 to 302-N. When receiving the log messages sent by the message stream platform 100, the brokers 302-1 to 302-N directly store the received log messages in the built-in memory of the brokers 302-1 to 302-N.

The consumption platform 200 includes the primary consumer device 201 and the consumer device 202. In addition to performing the function of the consumer device 202, the primary consumer device 201 is further responsible for managing all the consumer device 202. When log messages of a topic on the message stream platform need to be used, the consumption platform first sets a consumer group formed by the consumer devices that use the log messages of the topic, and then sends a subscription request for the log messages of the topic. After receiving the subscription request, the message stream platform 300 sends the log messages of the topic, subscribed by the consumption platform 200 to each consumer device in the consumer group.

In this embodiment, the primary consumer device 201 and the consumer device 202 on the consumption platform 200 may be independent servers, or may be virtual devices. When the primary consumer device 201 and the consumer device 202 are the virtual devices, the plurality of virtual devices may be constructed on a plurality of servers, or may be constructed on a same server. A layout of the virtual machine may be determined based on an actual running environment.

Currently, although some distributed systems can process the log messages in parallel, the distributed systems cannot process the log messages synchronously. If the messages cannot be processed synchronously, users' requirements in some scenarios cannot be met, for example, in a scenario the consumption platform needs to collect statistics on usage of a bucket by 8:00 p.m. to charge an enterprise user. When the usage of the bucket by 8:00 p.m. is determined, a sum of sizes of all photos stored in the bucket before 8:00 p.m. is collected. However, because the message stream platform processes the log messages in parallel, the log messages recording a photo size are scattered in log files corresponding to different brokers. Therefore, when the consumption platform obtains the log messages, each broker cannot synchronously send the log messages in the log file of each broker to the consumption platform. For example, one of the brokers sends, to the consumption platform, log messages with photos stored in the bucket before 8 p.m. Another broker sends, to the consumption platform, log messages with photos stored in the bucket before 6 p.m. As a result, the consumption platform cannot collect the statistics on the usage of the bucket by 8:00 p.m., and the enterprise user who use the bucket cannot be charged. In this embodiment, a mark is periodically set on the message stream platform for each log file having the same topic identifier. The mark is used to mark log messages generated in different time segments in each log file and a time segment sequence. In this way, when the consumer device consumes a plurality of log files, the log messages recorded in the plurality of log files of the broker in a same time segment are synchronously sent to the consumer device. In addition, after sending log messages in a time segment, log messages in a next time segment are sent to the consumer device according to the time segment sequence marked by the mark, to consume the log files synchronously. In this embodiment, the broker sends one log message to the consumer device, to consume the log message.

The following describes publishing and consumption of log messages of a topic in detail in embodiments with reference to flowcharts 2 to 8.

Figure 2:
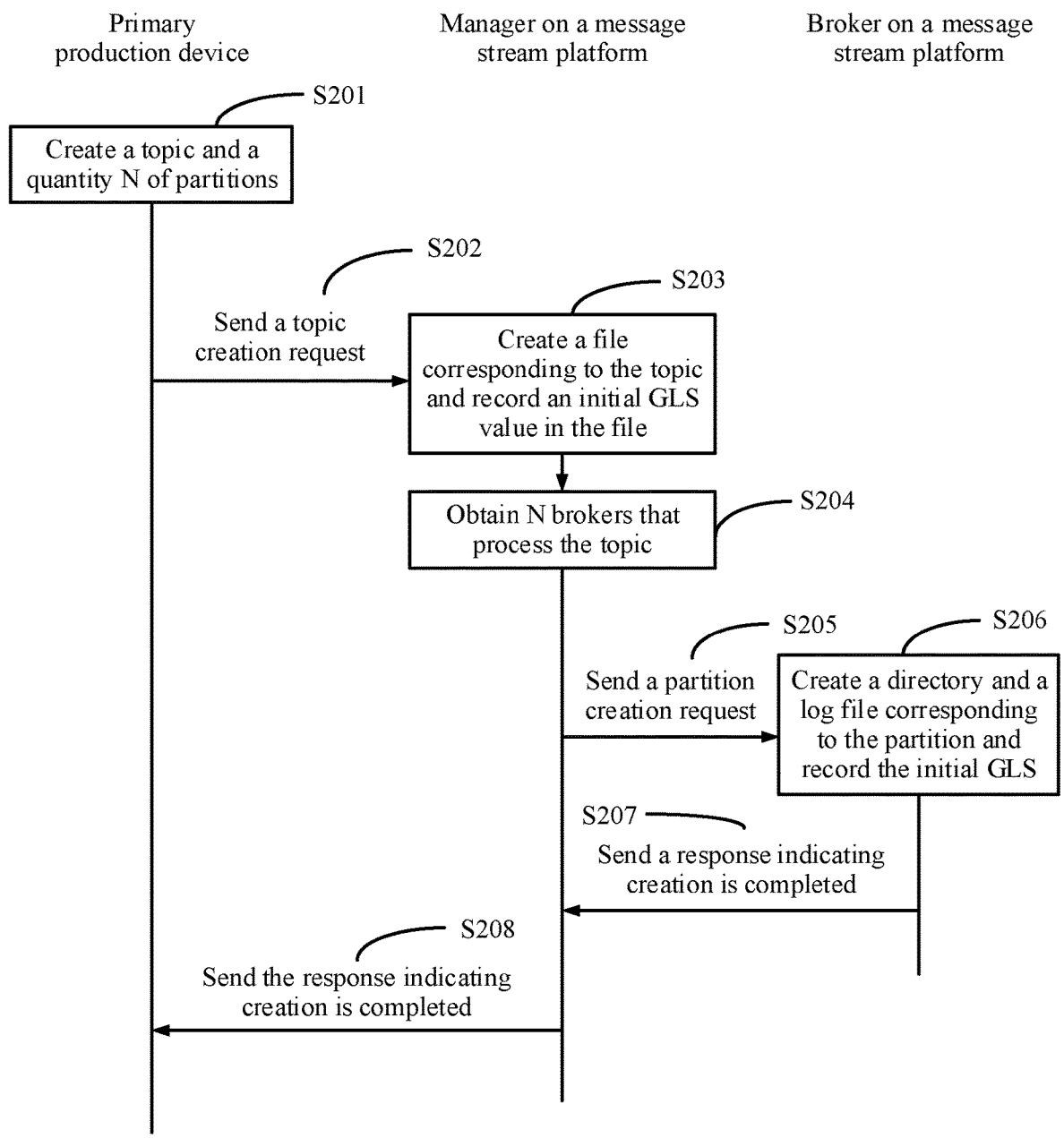
FIG. 2 is a flowchart of a method for creating a topic corresponding to a topic service on a message stream platform according to an embodiment.

FIG. 2 is a flowchart of a method for creating a topic corresponding to a topic service on a message stream platform 300.

Step S201: A primary production device 101 creates the topic in response to a user's operation, and sets a quantity N of partitions of an object corresponding to the topic.

For example, when the topic defined by a user is recording usage of each bucket in an object storage system on a cloud platform, a primary production server creates a topic identifier topic 1 for the topic. To enable log messages about the topic, generated by a production platform 100 to be processed by a plurality of brokers on a message stream platform in parallel, when the topic is created, a quantity of log messages about the topic that can be processed in parallel, namely, a quantity N of partitions is set.

Step S202: The primary production device 101 sends a topic creation request to a management device 301 on the message stream platform 300, where the topic creation request includes the topic identifier and the quantity N of partitions for the topic.

Step S203: After receiving the topic creation request, the management device 301 creates, in a storage device 400, a file corresponding to the topic.

For example, if the topic identifier is the topic 1, the file topic 1 is created in the storage device 400, and an attribute of the topic is recorded in the created file, for example, the quantity N of partitions for the topic, a time segment in which the log messages recorded in the log file are generated, and an initial value of a mark of a time segment sequence. In this embodiment, the mark is represented by a global sequence number (GLS). The GLS is used to mark log messages generated in each time segment, and the GLS may be incremented periodically to track a publishing sequence of the log messages of the topic. For example, assuming that a time for creating the file is 10:00 a.m., and the GLS is incremented every one minute, an initial value of the GLS is recorded as 0 at 10:00 a.m., the GLS is incremented to 1 at 10:01 a.m., the GLS is incremented to 2 at 10:02 a.m., the GLS is incremented to 3 at 10:03 a.m., and so on. In this way, a mark in a time segment from 10:00 a.m. to 10:01 a.m. is 0, a mark in a time segment from 10:01 a.m. to 10:02 a.m. is 1, a mark in a time segment from 10:02 a.m. to 10:03 a.m. is 2, and so on. Usage about the GLS will be described in detail below. It should be noted herein that the GLS is only an implementation of this embodiment, and other manners used to mark different time segments and the time segment sequence are all included in the solutions disclosed.

Step S204: The management device 301 determines, based on the quantity N of partitions carried in the topic creation request, brokers 302-1 to 302-N that process the log messages about the topic in parallel.

After obtaining the quantity N of partitions from the topic creation request, the management device 301 obtains the N brokers 302-1 to 302-N from the message stream platform, and generates N identifiers for the partitions, for example, pt(i), where i is a natural number from 1 to N. After the identifiers of the partitions are generated, an identifier of a partition processed by each of the brokers 302-1 to 302-N is allocated in sequence. In other words, a mapping relationship between the partition pt(i) and each of the brokers 302-1 to 302-N is established.

Step S205: The management device 301 initiates a partition creation request to each of the brokers 302-1 to 302-N, to indicate each of the brokers 302-1 to 302-N to create a log file corresponding to the partition processed by each of the brokers 302-1 to 302-N.

When the management device 301 sends the partition creation request, the topic identifier, the partition identifier pt(i) of the partition processed by each of the brokers 302-1 to 302-N, and the initial value 0 of the GLS may be carried in the partition creation request.

Step S206: After receiving the partition creation request, each of the brokers 302-1 to 302-N creates a log file that corresponds to the identifier of the partition and a topic name in the partition creation request and the initial value of the GLS. In another implementation, each broker includes only one log file. Log messages about different topics are recorded in the log file. The log messages about services of the different topics are identified by using the topic name. In this embodiment, for ease of description, an example in which one log file is generated for each topic is used for description.

For example, the log file may be represented as topic 1/pt(i)/meslog, where the topic 1 is the topic name, pt(i) is the identifier of the partition, and meslog is an identifier of the log file. The log file is used to record the log messages of the partition pt(i) corresponding to the topic. The initial value of the GLS and an initial value of an offset location of the log file may be recorded as, for example, {gls=0, offt=0}, where gls=0 indicates that the initial value of the GLS is 0, as GLS is incremented, the value of the GLS is updated, and offt=0 indicates that the initial value of the offset location of the log file, which is used to record a time point at which the GLS is updated and the offset location of the log file.

Step S207: After creating the log file for each partition, each of the brokers 302-1 to 302-N returns response information to the management device 301.

Step S208: After receiving the response information from each of the brokers 302-1 to 302-N, the management device 301 sends a response message to the primary production device 101 on the production platform 100, to notify the primary production device 101 that the topic is created.

After receiving the response information, the primary production device 101 may notify each production device 102 to publish the log messages about the topic to the message stream platform 300.

A service of one topic includes a plurality of objects. For example, each photo stored in the bucket by a user is one object for a service of an album topic. To process the photos in parallel, the primary production device 101 may send the received photos to different production devices for processing in a load balancing or a polling manner. In this way, a photo processed by one production device belongs to one shard. After the photo is stored in the bucket, log messages recording photo information are log messages that belong to the shard. In other words, each shard is a subset of log messages generated when the service of the topic is executed. For example, if the bucket in the object storage system stores photos A to P, namely, 16 objects, and A to D, E and H, I to L, and M to P are separately processed by different production devices, four fragments are formed. If shard identifiers: a shard 1, a shard 2, a shard 3, and a shard 4 are respectively set for the four shards, each shard may be represented as: a shard 1: A to D, a shard 2: E and H, a shard 3: I to L and a shard 4: M to P.

In the embodiments, two scenarios are provided. One scenario is that a quantity of production devices on the production platform does not change in a process of executing the service. In other words, a quantity of shards does not change. The other scenario is that a quantity of production devices on the production platform changes in a process of executing the service. In other words, a quantity of shards changes dynamically. The following separately describes the two scenarios.

The scenario that the quantity of production devices on the production platform does not change in the process of executing the service is first described. In other words, the quantity of shards does not change. For a procedure in which a production platform publishes log messages in the process of executing the service, refer to FIG. 3.

Step S301: Each production device 102 publishes log messages corresponding to each shard to the message stream platform 300, where the log messages carry a topic identifier and a shard identifier.

For example, after storing the received photo into the bucket, the production device 102 may generate the log messages describing related information of the photo, and send the log messages including an identifier of a partition corresponding to the production device and the topic identifier of the service to the message stream platform 300.

Step S302: After receiving the log messages, the management device 301 on the message stream platform 300 determines, based on the shard identifier included in the log messages, a partition to which the messages belong.

In the embodiments, the partition to which the messages belong may be determined by performing hash calculation on the shard identifier. For example, the partition to which the shard belongs may be determined based on a remainder obtained by dividing the shard identifier by N. The hash algorithm is merely an example for description. Another method for mapping the message to the partition based on the shard identifier also falls within the protection scope of the present disclosure.

Step S303: The management device 301 determines, based on the determined partition, one of the brokers 302-1 to 302-N that is corresponding to the partition.

In the step S204 in FIG. 2, in a process in which the management device 301 creates the topic, the relationship between the partition and each of the brokers 302-1 to 302-N is established. Therefore, the management device 301 may find, based on the mapping relationship, one of the brokers 302-1 to 302-N that is corresponding to the partition.

Step S304: The management device 301 forwards the received log messages to the broker 302-*i* corresponding to the partition.

Step S305: The broker 302-*i* that receives the log messages finds, based on the topic identifier included in the log messages, a log file corresponding to the topic, and writes the log messages into the log file.

In the step S206 in FIG. 2, when the broker 302-*i* creates the log file, the topic of the log file is recorded. Therefore, the log file may be found based on the topic identifier in the messages.

Step 306 and step S307: The broker 302-*i* sends, to the management device 301, a response indicating that message writing is completed, and the management device 301 further sends, to the production device 102, the response indicating that the message writing is completed.

The production device 102 may continuously write data into a plurality of log files corresponding to the topics based on the procedure.

Step S308: When detecting that a current time is a time for updating the GLS, the management device 301 increments the GLS in the file corresponding to the topic, for example, adding the GLS by one.

Step S309: The management device 301 sends an updated GLS to each broker 302-*i* corresponding to the topic.

Step S310: After receiving the updated GLS, each of the brokers 302-1 to 302-N records the updated GLS in the log file corresponding to the topic managed by the recorder and an offset location of the current log file, for example, if the updated GLS is 3 and the offset location of the current log file is XX, {gls=3, offt=XX} may be recorded.

Messages written in a current time segment and a writing sequence of the log messages written into the log file in the current time segment may be recorded by recording the GLS number and the offset location of the current log file. In this embodiment, the GLS number is incremented to record the sequence of log messages written into the log file in different time segments. In another embodiment, another mark that may identify the sequence may also be used to indicate the sequence of the log messages written into the log file in the different time segments.

Figure 4:
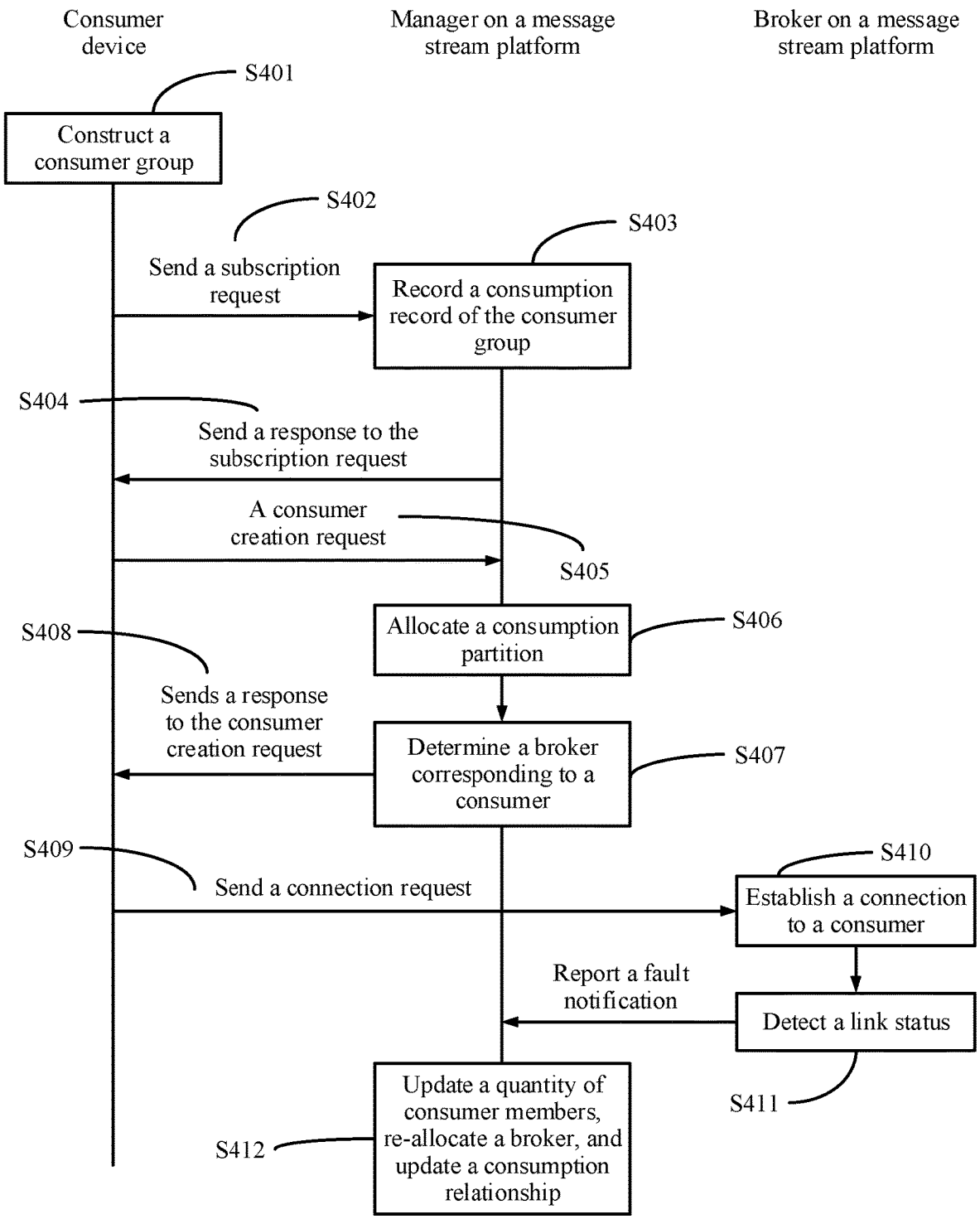
FIG. 4 is a flowchart of a method in which a message stream platform creates a consumption relationship for a consumer device on a consumption platform according to an embodiment.

The consumption platform 200 may send a subscription request for the topic to the message stream platform, to consume the log messages in the log file corresponding to the topic. For example, if the topic subscribed by the consumption platform 200 is an album, the consumption platform 200 sends a subscription message including a topic identifier that identifies the album. Before consuming the log messages corresponding to the topic, the consumption platform 200 first establishes a consumption relationship with the brokers 302-1 to 302-N on the message stream platform 300. FIG. 4 is a flowchart of a method in which the message stream platform 300 creates the consumption relationship for the consumer device on the consumption platform 200.

Step S401: The primary consumer device 201 on the consumption platform 200 constructs a consumer group that consumes the topic service, where the consumer group includes a plurality of consumer devices 201 that are specified to consume the topic.

When consuming messages of a topic, which are recorded on the message stream platform, the consumption platform 200 needs to first specify the consumer group for consuming the messages of the topic. Each consumer group includes at least one consumer device. There may be one or more consumer groups, and each consumer group has a unique identifier.

Step S402: The primary consumer device 201 sends the subscription request, where the subscription message carries the topic identifier and information of the consumer group, and the information of the consumer group includes an identifier of the consumer group and a quantity of consumer devices 202 included in the consumer group.

Step S403: After receiving the subscription request, the management device 301 generates a consumption record for the consumer group, where the consumption record includes the topic identifier, the identifier of the consumer group, the quantity of consumer devices included in the consumer group, and an initial GLS of a topic service, consumed by the consumer group, and the initial GLS is usually 0. The consumption record is used to record a process in which the consumer group consumes a message of the topic. A method for the consumption record recording the process in which the consumer group consumes the message of the topic is described in detail below.

Step S404: After generating the consumption record, the management device 301 returns response information of the subscription request.

Step S405: After receiving the response message, the primary consumer device 201 creates a consumer device 202 for the consumer group, and indicates each consumer device 202 to send a creation request to the management device 301.

After the consumption record is created, the primary consumer device 201 may specify the consumer device 202 that consumes the message of the topic. In the step S402, when the consumer group is created, only the quantity of consumer devices 202 included in the consumer group is specified, but consumer devices included in the consumer group are not specified. In the step S405, the consumer devices included in the consumer group are specified. In another embodiment, in step S402, a consumer device included in a consumer group may be specified when a consumer group is created. In this case, in step S405, each consumer device 202 is indicated to send a creation request to the management device 301.

Step S406: The management device 301 allocates a partition corresponding to the subscribed topic to each consumer device.

The manager 301 allocates, based on a quantity of partitions, a data volume of a log file in each partition, and the quantity of consumer devices included in the consumer group, the partition corresponding to the subscribed topic to each consumer device 201 according to a load balancing principle. The consumption partition corresponding to the subscribed topic, allocated to each consumer device may be recorded in one consumption relationship, for example, {consumerGroup, topic 1, pt(i), consumer(j)}, where consumerGroup indicates the identifier of the consumer group, and consumer(j) indicates the identifier of the consumer device.

When the quantity of consumer devices is equal to the quantity of partitions, one partition is allocated to each consumer device. When the quantity of consumer devices is less than the quantity of partitions, a plurality of partitions may be allocated to one consumer device.

Step S407: The management device 301 determines a broker corresponding to each consumer device.

After the consumption partition is allocated to each consumer device, the broker corresponding to each consumer device may be determined based on a correspondence between the partition and the broker. The mapping relationship between the consumer device 202 and the broker is also established. Because a plurality of partitions may be allocated to each consumer device 202, each consumer device 202 may also correspond to a plurality of brokers.

Step S408: The management device 302 sends response information of the creation request to each consumer device 202, where the response information carries an identifier of the broker corresponding to each consumer device.

Step S409: After receiving the response message, each consumer device 202 initiates a connection request to the broker indicated by the identifier of the broker, carried in the response message.

Step S410: After receiving the connection request, the broker establishes a connection to the consumer device 202.

Step S411: After the connection is established, the broker 302 detects a link status between the broker 302 and the connected consumer device 202, and reports to the management device 301 when the link is disconnected.

Step S412: After receiving the notification message, the management device 301 updates the quantity of consumer devices included in the consumer group recorded in the consumption record, and re-allocates a consumer device 202 to the broker 302 according to the load balancing principle.

After creating a consumption relationship for each consumer device 202, the management device 301 may indicate each of the brokers 302-1 to 302-N to send, to a corresponding consumer device 202 for consumption, the log messages corresponding to the topic subscribed to by a consumption platform managed by each of the brokers 302-1 to 302-N. For a method, refer to FIG. 5.

Step S501: The management device 301 sends a sending request to each of the brokers 302-1 to 302-N that process the messages of the topic, where the sending request carries the topic identifier, the identifier of the consumer group, and a GLS that needs to be consumed currently.

Step S502: After receiving the sending request, each of the brokers 302-1 to 302-N finds, based on the topic identifier, a log file corresponding to a partition processed by the broker 302-$i$, determines an offset of a log file corresponding to the current GLS, and sends at the offset location, messages recorded in the log file.

In the log file, each GLS corresponds to one offset location in the log file. When the sending request is received, the broker 302-$i$ starts to send the messages in the log file at the offset location corresponding to the current GLS. One file is used to record a consumption progress of each consumer group on the log file. The consumption progress is an offset location, in the log file, of log messages that are sent to the consumption platform last time in the log file, for example, topic 1/pt(i)/consumergroup 1/off_progress, where off_progress indicates the offset location of the messages that is sent last time in the log file. Because one topic may be consumed by a plurality of consumer groups, a consumption progress of each consumer group on the log file is recorded.

Step S503: A consumer device 202 receives and stores the messages sent by the broker 302-$i$.

Step S504: After detecting that the messages corresponding to the current GLS in the log file are sent, the broker 302-$i$ sends a notification message to the management device 301, to notify the management device 301 that the messages corresponding to the current GLS in the log file are consumed.

That the messages corresponding to the current GLS are sent indicates that off_progress recorded in the consumption progress is adjacent to an offset location of a log file corresponding to a next GLS of the current GLS.

The notification message carries the topic identifier, the identifier of the consumer group, a GLS, and a message partition identifier. The management device may identify, based on the topic identifier, the identifier of the consumer group, and the message partition identifier, that a message corresponding to a GLS, in a partition of a topic, corresponding to a consumer group is consumed.

Step S505: After the management device 301 receives notification messages that are for the consumer group and that are sent by all brokers 302-1 to 302-N corresponding to the topic service, the management device 301 updates the consumption progress of the consumer group on the topic, namely, incrementing the GLS in the consumption record, and returns to perform the step S501 until all log files corresponding to each partition are consumed.

In the scenario, after the log files of each partition in one time segment are consumed by setting the SGL, log messages of the log file in a next time segment are sent, so that the log files of each partition are consumed synchronously.

For the log messages sent to the consumption platform 200, the consumption platform 200 may perform further processing on the log messages as required, for example, charging based on usage of a bucket at one moment. The log messages generated in each time segment are marked and the messages generated in the same time segment are sent to the consumption platform, so that the consumption platform can charge the usage of the bucket at the moment.

The second scenario provided in this embodiment is that in the another scenario, in the process of executing the service by the distributed system, the quantity of production devices on the production platform changes, and the quantity of shards also dynamically changes. For example, because of service volume increase, the production devices may be increased, or because of some faulty production devices, the production devices 102 are reduced. The dynamic change of the quantity of production devices 102 may cause the change of a shard for each topic service. For example, if the production devices are increased, a shard processed by a production device with a heavy load is split to generate two shards.

Figure 6:
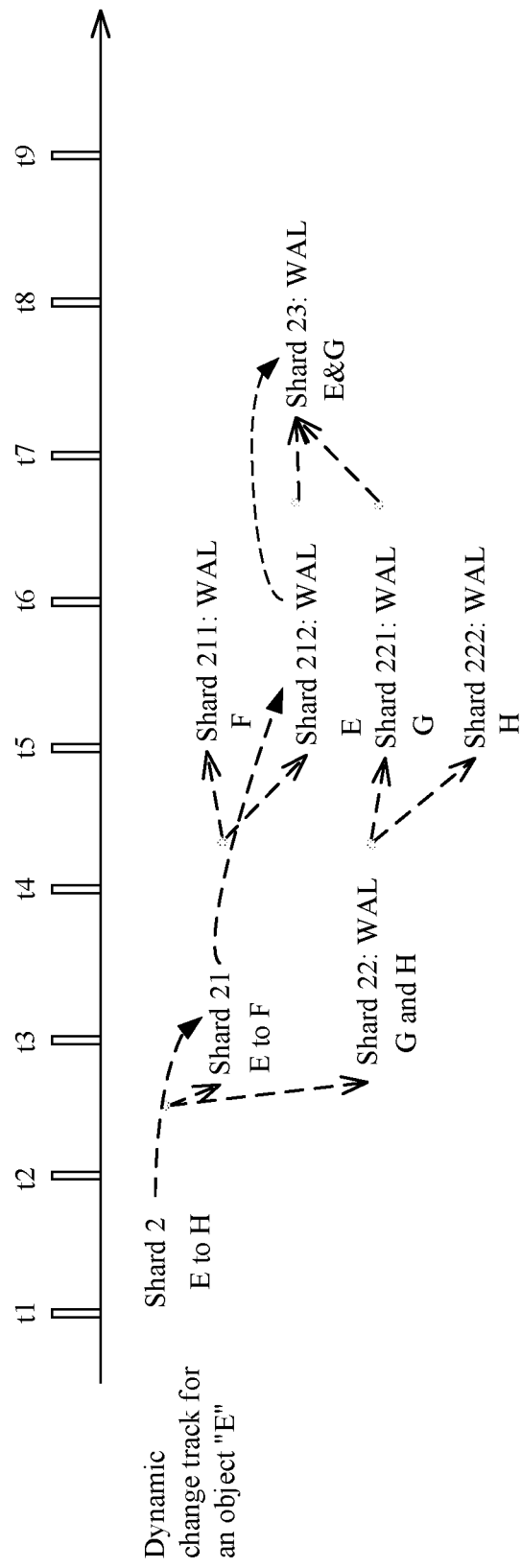
FIG. 6 is a schematic diagram of a change of an object after a shard to which log messages from a production platform belong changes according to an embodiment.

For example, as shown in FIG. 6, service objects included in a shard 2 are E to H. Because of production device increase, the shard 2 may be split into two shards (in another embodiment, an original shard may be separated into one shard, for example, the shard 2 is separated into a shard 21): a shard 21: E to F and a shard 22: G to H. As time goes by, the shard 21 and the shard 22 may further be split. For example, the shard 21 is further split into a shard 211 and a shard 212. The shard 22 is further split into a shard 221 and a shard 222. A shard 32 and a shard 33 may be aggregated into a shard 41. Shard splitting and aggregation cause a change of a partition to which log messages of the shard belong. As a result, log messages of a same object are distributed to different partitions. For example, an object E is processed by a production device A during storage. A shard to which the object E belongs is the shard 2, and a partition to which the shard 2 is mapped is P(2). However, because the production device A is faulty, or a production device is added, objects processed by the production device A are processed by a production device B and a production device C separately. Therefore, the shard 2 is split into the shard 21 and the shard 22, and the shard to which the service object E belongs changes from the shard 2 to the shard 21. As described above, a partition to which a shard belongs is determined based on the shard identifier. Because the shard to which the service object E belongs changes from the shard 2 to the shard 21, the partition to which the object belongs may also change from P(2) to P(3). Therefore, because log files in different shards are consumed in parallel, order-preserving consumption cannot be implemented after the shard for the service object E changes.

For example, for a photo that initially belongs to the shard 2, messages in the shard 2 are mapped to the partition P(2). When the photo is stored in the bucket, a production device publishing the log messages of the shard 2 publishes log messages that record generation of the photo, a broker 302-2 corresponding to P(2) stores the log messages in a log file corresponding to P(2). Because of the splitting of the shard 2, the photo belongs to the shard 21, and the shard 21 is mapped to the partition P(3). In this case, if the photo is deleted from the bucket, the production device 102 publishing the shard 21 generates messages that record deletion of the photo. A broker 302-3 corresponding to P(3) stores the messages in a log file corresponding to P(3). In this way, in a disaster recovery and backup scenario, after the photo in the bucket on the production platform is backed up to the consumption platform, the consumption platform further obtains the log messages of the photo from the message stream platform, to ensure that data on the consumption platform is consistent with data on the production platform. However, in a process of obtaining the log messages, because of the dynamic change of the shard, the log messages of the same photo may be recorded in different log files. The log messages recording that the photo is generated may be consumed after the log messages recording the deleting of the photo. This causes log management confusion on the consumption platform.

Figure 7:
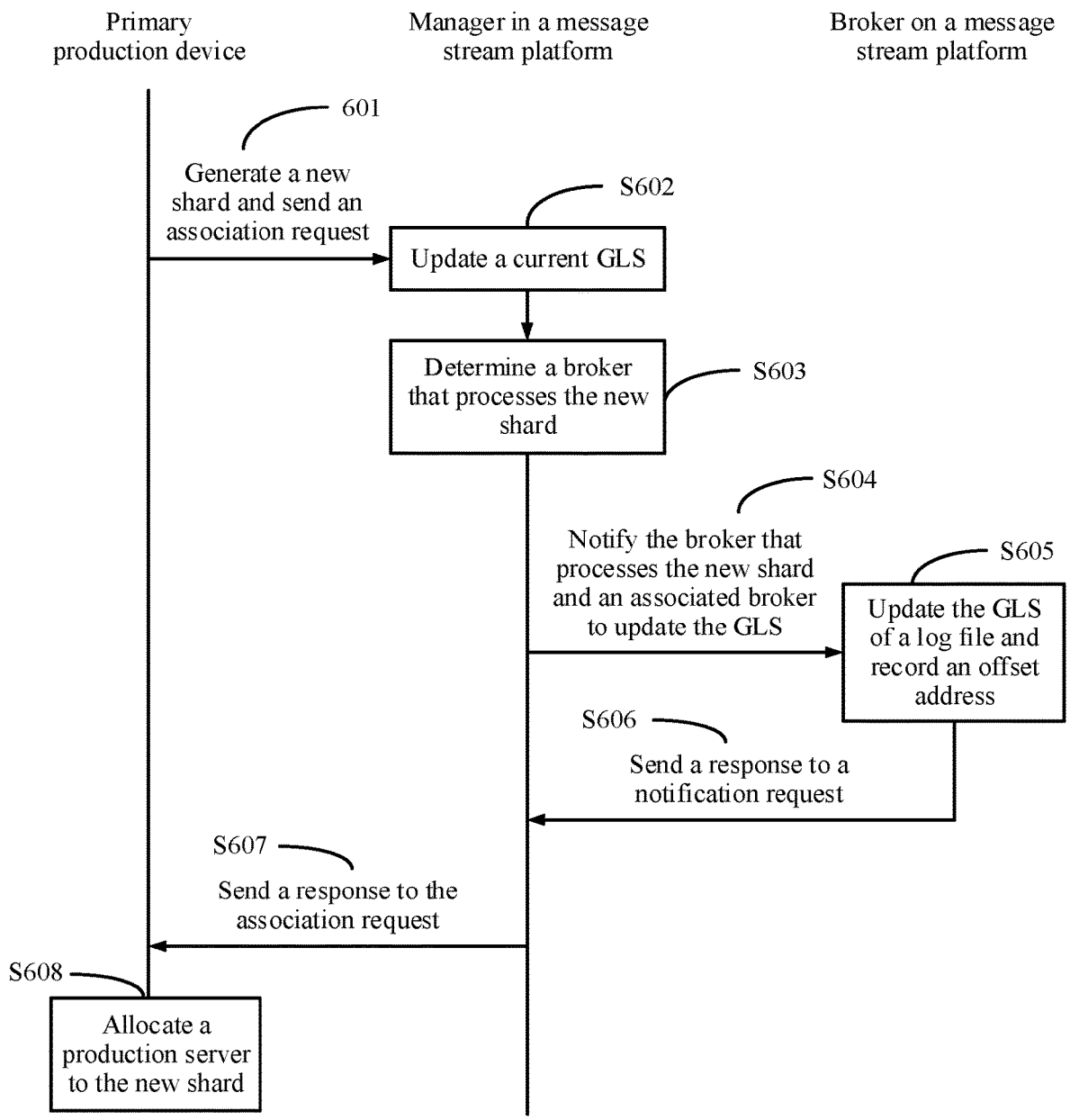
FIG. 7 shows a method for ensuring order-preserving consumption of objects after a shard to which log messages from a production platform belong changes according to an embodiment.

A method shown in FIG. 7 in an embodiment is a method for ensuring order-preserving consumption of objects after the shard dynamically changes in the second scenario.

Step S601: When the shard dynamically changes, for example, after splitting or aggregation occurs, a new shard is generated, a primary production device 101 publishes an association request, where the association request carries a topic identifier of a topic service, the new shard identifier, and an identifier of an associated shard.

The identifier of the associated shard is an identifier of a shard before splitting or aggregation into the new shard, namely, an identifier of a shard that may require order preserving. For example, a shard 21 and a shard 22 are split from a shard 2, and the shard 21 and the shard 22 needs to be order-preserved with the shard 2. In this case, the shard 21 and the shard 22 are the identifiers of the new shards, and the shard 2 is the identifier of the associated shard.

Step S602: After receiving the association request, a management device 301 finds, based on the topic identifier, a current GLS corresponding to the topic identifier, and updates the GLS, for example, adds 1.

As described above, a file in the management device records the current GLS number. After the association request is received, the current GLS number may be found in the file.

Step S603: The management device 301 determines a partition to which the new shard belongs, and determines a broker 302-*i* corresponding to the partition.

Step S604: The management device 301 notifies the broker 302-*i* corresponding to the new shard and a broker corresponding to the associated shard to update the GLS.

Step S605: The broker 302-*i* that receives the notification updates the GLS in the log file corresponding to the topic, and records an offset address of the log file corresponding to the GLS.

Step S606: The broker 302-*i* sends a response to the notification message to the management device 301.

Step S607: After receiving the response information of the notification message, the management device 301 sends response information of the association request to the primary production device 101.

Step S608: After receiving the response message, the primary production device 101 allocates a production device 102 to the new shard, and notifies the new production device 102 to publish a message corresponding to the new shard.

After receiving the notification, the production device may normally publish the messages of the new shard.

In another implementation of the second scenario, in step 601, a production device 102 that publishes a new shard may publish an association request which does not include an identifier of an associated shard. However, in step 603, all brokers associated with the topic are notified to update a GLS. In this way, the changed shard is consumed after a shard before the change, to implementing order preserving of a same object in different shards.

In the second scenario, an order-preserving relationship between the shard before the change and the changed shard is set, and the GLS is updated to ensure that the changed shard is consumed after the shard before the change. In this way, even if the same object is allocated to the different partitions after the change, the order-preserving consumption may also be ensured.

Figure 8A:
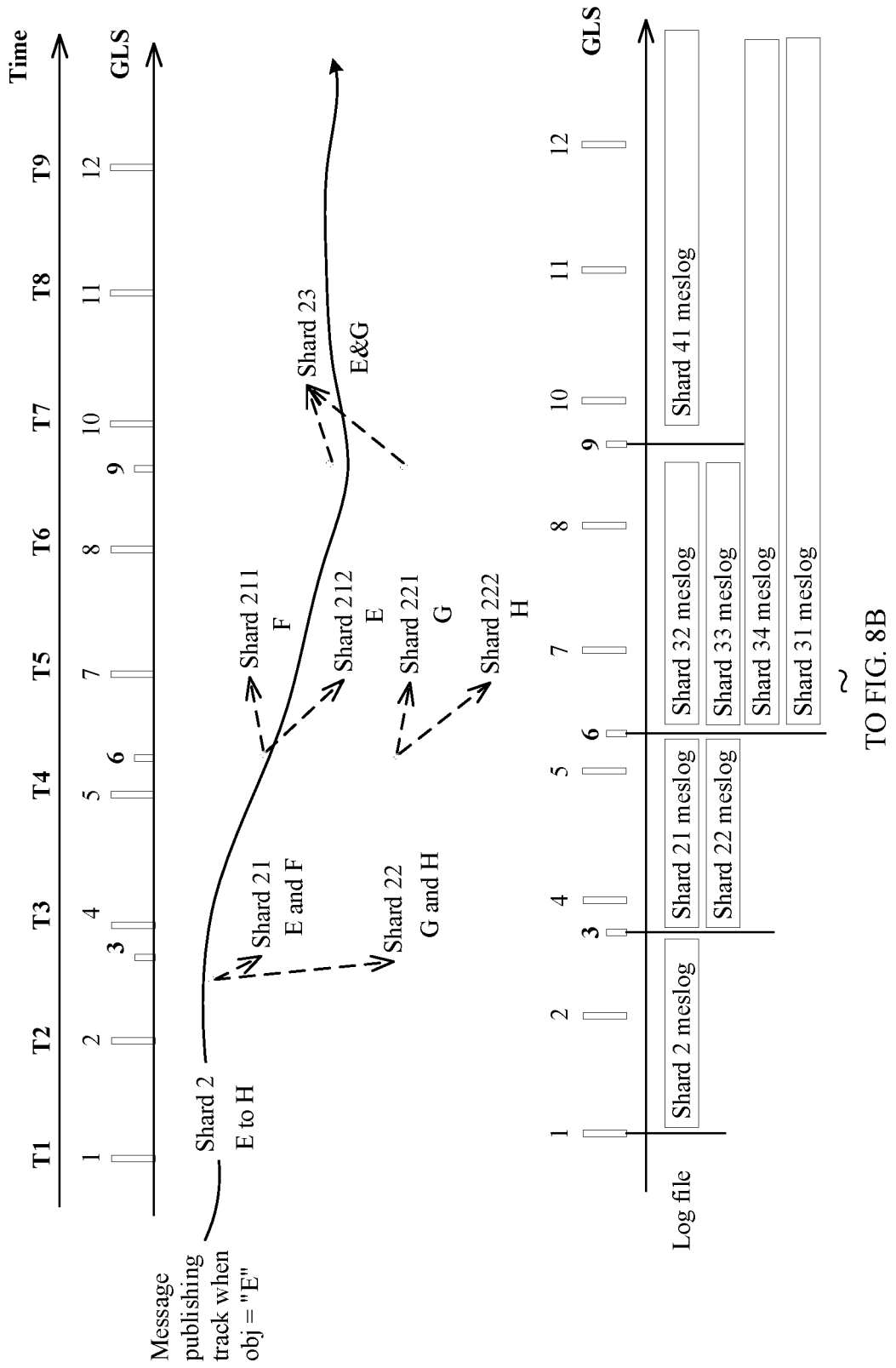
FIG. 8A and FIG. 8B are a schematic diagram of order-preserving consumption of objects after a shard to which log messages from a production platform belong changes according to an embodiment.
Figure 8B:
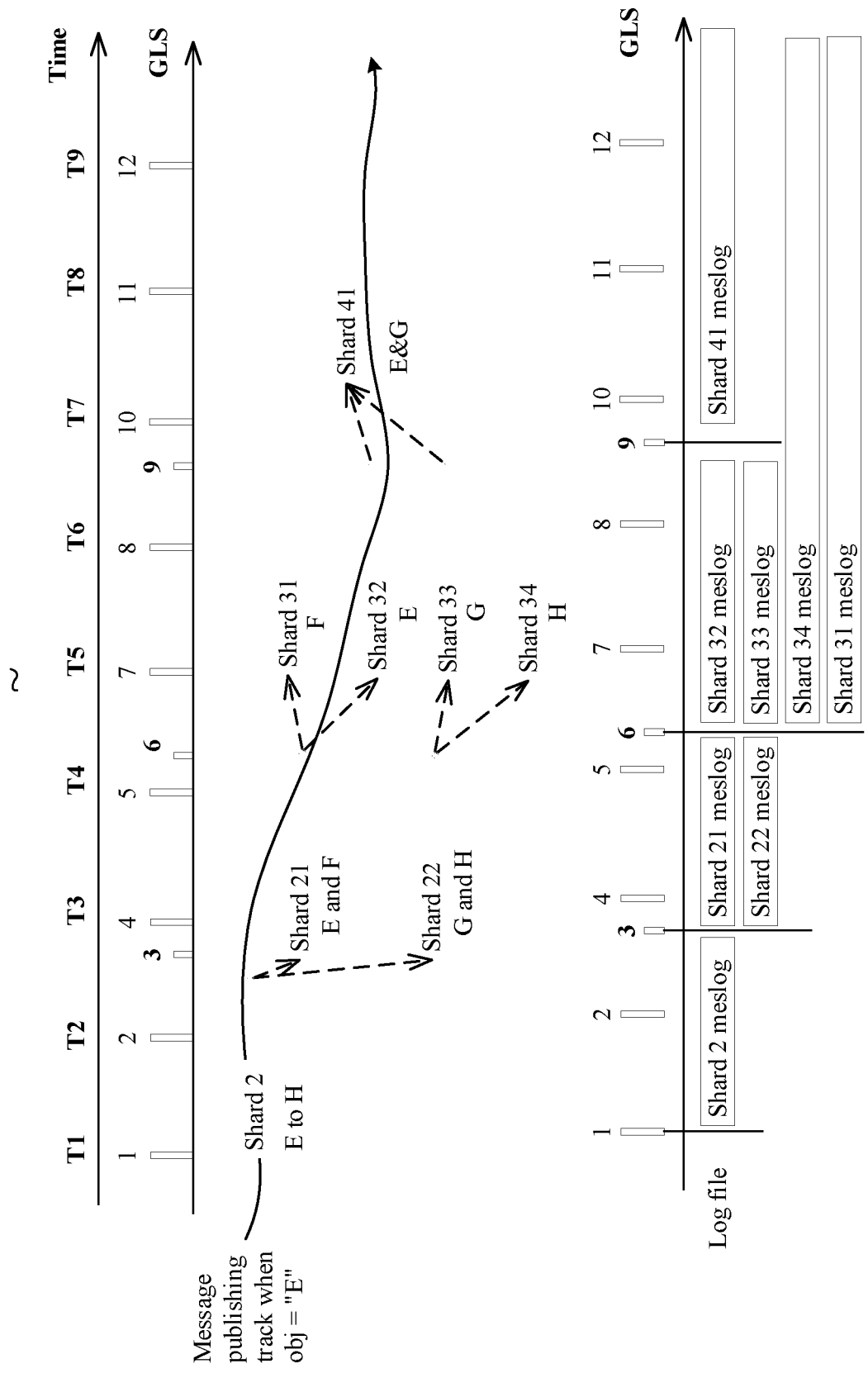

FIG. 8A and FIG. 8B are a schematic diagram in which after a shard 2 dynamically changes in a message publishing process, order preserving is performed, by using a GLS, for an object E that belongs to different shards after the object E dynamically changes. As shown in the figure, T1 to T9 are preset times for updating the GLS. After the shard 2 is split between T2 and T3, a shard to which the object E belongs changes from the shard 2 to a shard 21, and a management device 301 adds the GLS once, for example, 3. The added GLS is sent to a broker 302-i corresponding to an associated shard 2, the new shard 21, and a shard 22. In log files shard 2 meglog, shard 21 meglog, and shard 21 meglog corresponding to the shard 2, the shard 21, and the shard 22, brokers 302-1 to 302-N record offsets corresponding to the GLS in the log files. Then, between T4 and T5, the shard 21 is split into a shard 31 and a shard 32, and the shard 22 is split into a shard 33 and a shard 34. Between T6 and T7, the shard 31 and the shard 33 are aggregated into a shard 41. The shard to which the object E belongs changes from the shard 2 to the shard 21, and then to the shard 32 and the shard 41. The log file that records the object E changes from shard 2 meglog to shard 21 meglog, and then to shard 32 meglog, and shard 41 meglog. In this way, when a consumer group consumes the log files in a GLS sequence, even if messages of the object E are recorded in different log files before and after the shard change, the order-preserving consumption may further be performed.

An example in which the object is a photo and the photo belongs to the shard 2 is used as example, when the photo is stored in a bucket in an object storage system, messages recording that the photo is generated are stored in a log file corresponding to P(2). Then, because of splitting of the shard 2, the photo belongs to the new shard 21 and a partition corresponding to the new shard 21 is P(3). After the shard 2 is split, the management device increases the GLS from original 5 to 6. In this case, a GLS number is increased to the log files corresponding to P(2) and P(3), and a current offset location of the log file is recorded. When the photo is deleted from the bucket, messages recording that the photo is deleted are recorded in the log file corresponding to P(3), and are recorded after a corresponding offset location when the GLS is 6. The messages recording that the photo is generated are recorded before the corresponding offset location when the GLS is 6. When the consumption platform consumes the log files according to a sequence of the GLS, messages before the corresponding offset location when the GLS is 6 in the log files are consumed first, and then messages after the corresponding offset location when the GLS is 6 in the log files are consumed. In this way, even if change messages of the photo are written into the different log files after the splitting, the order-preserving consumption can be implemented.

Figure 9:
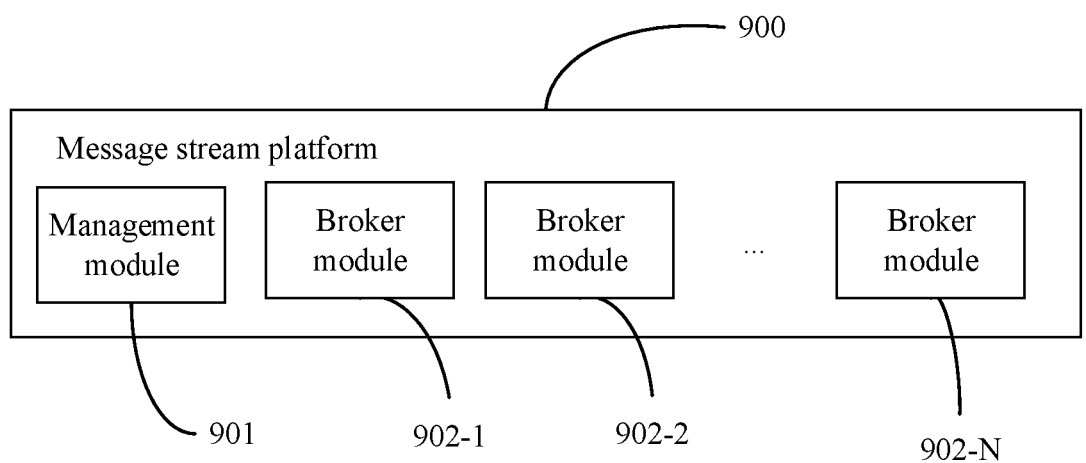
FIG. 9 is a diagram of functional modules of a production platform according to an embodiment.

FIG. 9 is a structural diagram of a message stream platform 900 according to an embodiment. The message stream platform 900 includes a management module 901 and a plurality of brokers 902-1 to 902-N. The management module 901 is applied to the management device 301, and the plurality of brokers 902-1 to 902-N are respectively applied to the brokers 302-1 to 302-N. The message stream platform 900 may be implemented by using hardware, or may be implemented by using hardware. The management module 901 is configured to receive a plurality of log messages from the production platform 100, and forward the plurality of log messages to the brokers 902-1 to 902-N. Any one broker 902-i is configured to store the plurality of log messages in a log file based on a time segment, and send log messages that are related to the first service and that are in a first time segment to a consumption platform. In an implementation, the broker module 902-i is configured to send the log messages that are related to the first service and that are in the first time segment to the consumption platform according to a request from the consumption platform. In another implementation, the broker module 902-i is configured to send the log messages that are related to the first service and that are in the first time segment to the consumption platform based on a subscription relationship; and after the log messages that are related to the first service and that are in the first time segment are sent to the consumption platform, send log messages that are related to the first service and that are in a second time segment to the consumption platform. The management module 901 is further configured to set a time segment mark, where the time segment mark is used to identify a segment of time, and send the time segment mark to the broker module; and the broker module 902-i stores the plurality of log messages in the log file based on the time segment mark. The management module 901 periodically updates the time segment mark, and sends the updated time segment mark to the broker module 902-i. The broker module 902-i is further configured to mark a time segment for each of received log messages by using the updated time segment mark.

In an implementation, the management module 901 is further configured to, when an association request sent by the production platform is received, update the time segment mark, and send the updated time segment mark to the broker module 902-i, where the association request carries shard identifiers of both a second shard and a first shard or shard identifiers of both a second shard and a third shard, the second shard is obtained by splitting the first shard or by aggregating the first shard and the third shard, the first shard and the third shard each are a subset formed by the log messages about executing the first service, and the association request is sent by the production platform during the splitting or aggregation; and the broker module 902-i is configured to mark a time segment for each of subsequently received log messages by using the updated time segment mark.

In another implementation, the management module 901 is further configured to, when an association request sent by the production platform is received, update the time segment mark, and send the updated time segment mark to the broker module 902-i, where the association request carries a shard identifier of a second shard, the second shard is obtained by splitting a first shard or by aggregating a first shard and a third shard, the first shard and the third shard each are a subset formed by the log messages about executing the first service, and the association request is sent by the production platform during the splitting or aggregation; and the broker module 902-i is configured to set, according to the association request, a new time segment mark for each of subsequently received log messages related to the first service.

Figure 3:
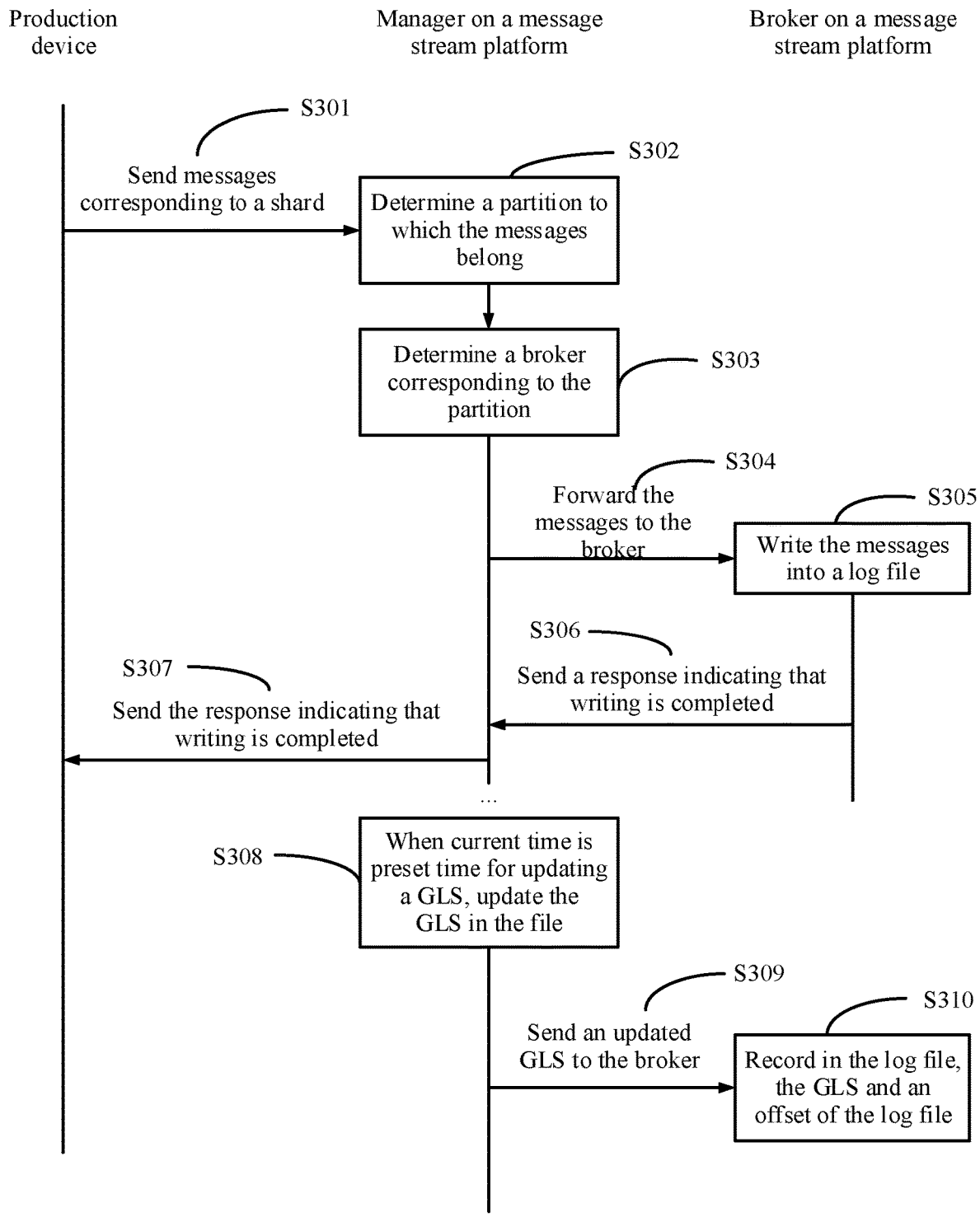
FIG. 3 is a flowchart of a method for publishing log messages by a production platform according to an embodiment.
Figure 5:
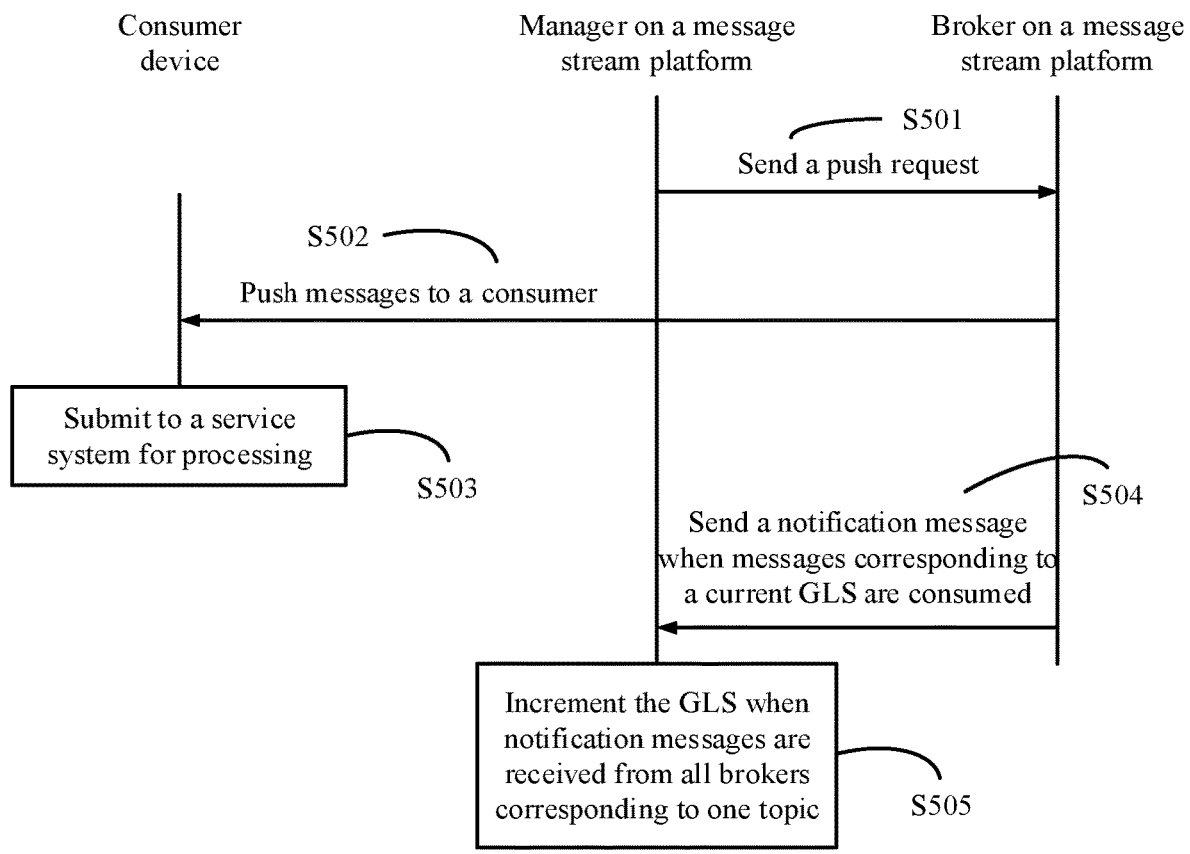
FIG. 5 is a flowchart of a method in which a message stream platform pushes log messages to a consumption platform according to a subscription request from the consumption platform.

The management module 901 performs steps S303, S304, S308, and S309 in the method shown in FIG. 3, steps S501 and S505 in FIG. 5, steps S602, S603, S604, and S607 in FIG. 6 to implement the functions. The broker module 902-i performs steps S305, S306, and S310 in the method shown in FIG. 3, steps S502 and S504 in FIG. 5, and steps S605 and S606 in FIG. 6 to implement the functions.

Figure 10:
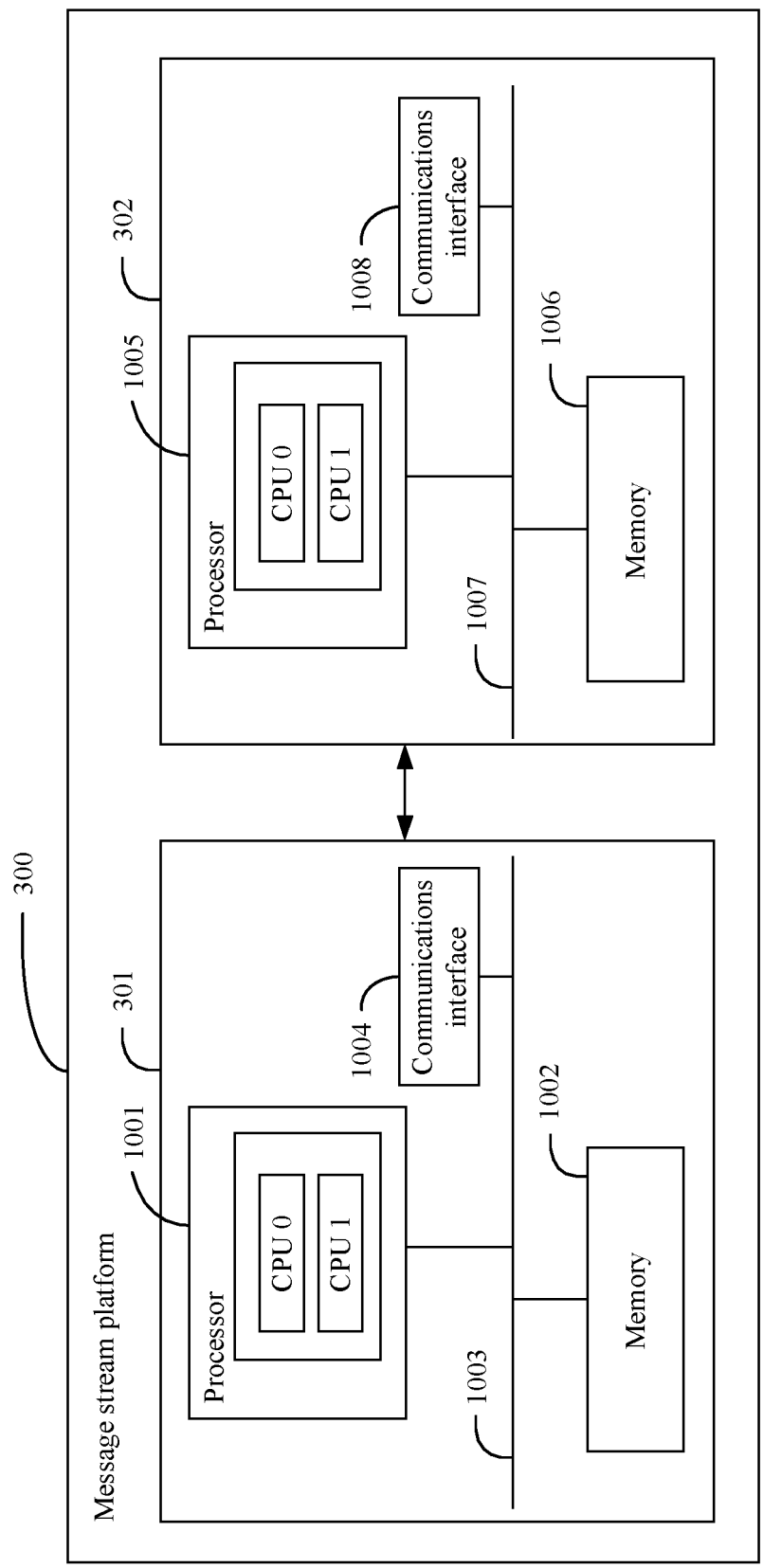
FIG. 10 is a structural diagram of hardware of a management device and a broker on a production platform according to an embodiment.

FIG. 10 is a structural diagram of hardware of the management device 301 and any broker 302-i on the message stream platform 300. As shown in the figure, the management device 301 includes a processor 1001, a memory 1002, a bus 1003, and a communications interface 1004. A structure of the broker 302 is basically the same as that of the management device, and includes a processor 1005, a memory 1006, a bus 1007, and a communications interface 1008. The processor 1001 and the processor 1005 may have a plurality of implementation forms, for example, may be a central processing unit (CPU) or a graphics processing unit (GPU), or the processor 610 may be a single-core processor or a multi-core processor. The processor 1001 and the processor 1005 may be a combination of a CPU and a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. The processor 1001 and the processor 1005 may also be separately implemented by using a logic device with built-in processing logic, for example, an FPGA or a digital signal processor (DSP).

The communications interface 1004 and the communications interface 1008 may be a wired interface or a wireless interface, and are configured to communicate with another unit or device. The wired interface may be an Ethernet interface or a local interconnect network (LIN). The wireless interface may be a cellular network interface, a wireless local area network interface, or the like. The bus 640 may be classified into an address bus, a data bus, a control bus, and the like.

Storage media of the memory 1002 and the memory 1006 may be a volatile memory and a non-volatile memory, or may include both a volatile memory and a non-volatile memory. The non-volatile memory may be a read-only memory (ROM), a programmable ROM (PROM), an erasable programmable ROM (EPROM), an electrically erasable programmable ROM (EEPROM), or a flash memory. The volatile memory may be a random-access memory (RAM), used as an external cache. Through example but not limitative description, many forms of RAMs may be used, for example, a static RAM (SRAM), a dynamic RAM (DRAM), a synchronous DRAM (SDRAM), a double data rate SRAM (DDR SDRAM), an enhanced SDRAM (ESDRAM), a SynchLink DRAM (SLDRAM), and a direct Rambus DRAM (DR RAM). The memory 1002 and the memory 1006 are configured to store program code and data. The processor 1001 executes the program code in the memory 1002 to implement the method steps performed by the management device in FIG. 2, FIG. 3, FIG. 4, FIG. 5, and FIG. 7. The processor 1005 executes the program code in the memory 1006 to implement the method steps performed by the broker in FIG. 2, FIG. 3, FIG. 4, FIG. 5, and FIG. 7.

The foregoing descriptions are merely implementations, but are not intended to limit the protection scope of the present disclosure. Any variation or replacement readily figured out by a person skilled in the art within the technical scope disclosed shall fall within the protection scope of the present disclosure. Therefore, the protection scope of the present disclosure shall be subject to the protection scope of the claims.

What is claimed is:

1. A method implemented by a message stream platform and comprising:
    receiving, from a production platform, log messages that record information about a first service executed by the production platform;
    allocating time segment marks to the log messages, wherein the time segment marks identify segments of time;
    storing the log messages in a log file based on time segments and the time segment marks, wherein the time segments comprise a first time segment;
    sending, to a consumption platform, the log messages that are related to the first service and that are in the first time segment;
    receiving, from the production platform, an association request comprising a shard identifier of a second shard, wherein the second shard is based on splitting a first shard or aggregating the first shard and a third shard, and wherein the first shard and the third shard are a subset formed by the log messages during execution of the first service; and
    setting, according to the association request, new time segment marks for subsequently received log messages related to the first service.

2. The method of claim 1, further comprising further sending the log messages in response to a request from the consumption platform.

3. The method of claim 1, wherein the time segments further comprise a second time segment, and wherein the method further comprises:
    further sending, to the consumption platform based on a subscription relationship, the log messages that are related to the first service and that are in the first time segment; and
    sending, to the consumption platform, the log messages that are related to the first service and that are in the second time segment.

4. The method of claim 1, wherein allocating the time segment marks comprises:
    periodically updating the time segment marks to obtain updated time segment marks; and
    marking time segments for subsequently received log messages using the updated time segment marks.

5. The method of claim 4, further comprising:
    receiving, from the production platform, an association request comprising shard identifiers of both a first shard and a second shard or of both the second shard and a third shard, wherein the first shard and the third shard are a subset formed by the log messages during execution of the first service, and wherein the second shard is based on splitting the first shard or aggregating the first shard and the third shard; and
    setting, according to the association request, new time segment marks for subsequently received log messages belonging to the first shard and the second shard.

6. A message stream platform comprising:
    a memory configured to store instructions; and
    one or more processors coupled to the memory and configured to execute the instructions to cause the message stream platform to:
        receive, from a production platform, log messages that record information about a first service executed by the production platform;
        allocate time segment marks to the log messages, wherein the time segment marks identify segments of time;
        store the log messages in a log file based on time segments and the time segment marks, wherein the time segments comprise a first time segment;
        send, to a consumption platform, the log messages that are related to the first service and that are in the first time segment;
        receive, from the production platform, an association request comprising a shard identifier of a second shard, wherein the second shard is based on splitting a first shard or aggregating the first shard and a third shard, and wherein the first shard and the third shard are a subset formed by the log messages during execution of the first service; and set, according to the association request, new time segment marks for subsequently received log messages related to the first service.

7. The message stream platform of claim 6, wherein the one or more processors are further configured to execute the instructions to cause the message stream platform to further send the log messages in response to a request from the consumption platform.

8. The message stream platform of claim 6, wherein the time segments further comprise a second time segment, and wherein the one or more processors are further configured to execute the instructions to cause the message stream platform to:

further send, to the consumption platform based on a subscription relationship, the log messages that are related to the first service and that are in the first time segment; and send, to the consumption platform, the log messages that are related to the first service and that are in the second time segment.

9. The message stream platform of claim 6, wherein the one or more processors are further configured to execute instructions to cause the message stream platform to:

periodically update the time segment marks to obtain updated time segment marks; and mark time segments for subsequently received log messages using the updated time segment marks.

10. The message stream platform of claim 9, wherein the one or more processors are further configured to execute the instructions to cause the message stream platform to:

receive, from the production platform, an association request comprising shard identifiers of both a first shard and a second shard or of both the second shard and a third shard, wherein the first shard and the third shard are a subset formed by the log messages about executing the first service, and wherein the second shard is based on splitting the first shard or aggregating the first shard and the third shard; and set, according to the association request, new time segment marks for subsequently received log messages belonging to the first shard and the second shard.

11. A computer program product comprising instructions that are stored on a non-transitory computer-readable medium and that, when executed by one or more processors, cause a message stream platform to:

receive, from a production platform, log messages that record information about a first service executed by the production platform;

allocate time segment marks to the log messages, wherein the time segment marks identify segments of time;

store the log messages in a log file based on time segments and the time segment marks, wherein the time segments comprise a first time segment;

send, to a consumption platform, the log messages that are related to the first service and that are in the first time segment;

receive, from the production platform, an association request comprising a shard identifier of a second shard, wherein the second shard is based on splitting a first shard or aggregating the first shard and a third shard, and wherein the first shard and the third shard are a subset formed by the log messages during execution of the first service; and set, according to the association request, new time segment marks for subsequently received log messages related to the first service.

12. The computer program product of claim 11, wherein the instructions, when executed by the one or more processors, further cause the message stream platform to further send the log messages in response to a request from the consumption platform.

13. The computer program product of claim 11, wherein the time segments further comprise a second time segment, and wherein the instructions, when executed by the one or more processors, further cause the message stream platform to:

further send, to the consumption platform based on a subscription relationship, the log messages that are related to the first service and that are in the first time segment; and send, to the consumption platform, the log messages that are related to the first service and that are in the second time segment.

14. The computer program product of claim 11, wherein the instructions, when executed by the one or more processors, further cause the message stream platform to allocate the time segment marks by:

periodically updating the time segment marks to obtain updated time segment marks; and marking time segments for subsequently received log messages using the updated time segment marks.

15. The computer program product of claim 14, wherein the instructions, when executed by the one or more processors, further cause the message stream platform to:

receive, from the production platform, an association request comprising shard identifiers of both a first shard and a second shard or of both the second shard and a third shard, wherein the first shard and the third shard are a subset formed by the log messages during execution of the first service, and wherein the second shard is based on splitting the first shard or aggregating the first shard and the third shard; and set, according to the association request, new time segment marks for subsequently received log messages belonging to the first shard and the second shard.

16. A non-transitory computer-readable medium comprising instructions that, when executed by one or more processors, cause a message stream platform to:

receive, from a production platform, log messages that record information about a first service executed by the production platform;

allocate time segment marks to the log messages, wherein the time segment marks identify segments of time;

store the log messages in a log file based on time segments and the time segment marks, wherein the time segments comprise a first time segment;

send, to a consumption platform, the log messages that are related to the first service and that are in the first time segment;

receive, from the production platform, an association request comprising a shard identifier of a second shard, wherein the second shard is based on splitting a first shard or aggregating the first shard and a third shard, and wherein the first shard and the third shard are a subset formed by the log messages during execution of the first service; and set, according to the association request, new time segment marks for subsequently received log messages related to the first service.

17. The non-transitory computer-readable medium of claim 16, wherein the instructions, when executed by the one or more processors, further cause the message stream platform to further send the log messages in response to a request from the consumption platform.

18. The non-transitory computer-readable medium of claim 16, wherein the time segments further comprise a second time segment, and wherein the instructions, when executed by the one or more processors, further cause the message stream platform to:
further send, to the consumption platform based on a subscription relationship, the log messages that are related to the first service and that are in the first time segment; and
send, to the consumption platform, the log messages that are related to the first service and that are in the second time segment.

19. The non-transitory computer-readable medium of claim 16, wherein the instructions, when executed by the one or more processors, further cause the message stream platform to allocate the time segment marks by:
periodically updating the time segment marks to obtain updated time segment marks; and
marking time segments for subsequently received log messages using the updated time segment marks.

20. The non-transitory computer-readable medium of claim 19, wherein the instructions, when executed by the one or more processors, further cause the message stream platform to:
receive, from the production platform, an association request comprising shard identifiers of both a first shard and a second shard or of both the second shard and a third shard, wherein the first shard and the third shard are a subset formed by the log messages during execution of the first service, and wherein the second shard is based on splitting the first shard or aggregating the first shard and the third shard; and
set, according to the association request, new time segment marks for subsequently received log messages belonging to the first shard and the second shard.

* * * * *